United States Patent [19]

Kita

[11] 4,368,692

[45] Jan. 18, 1983

[54] WIND TURBINE

[75] Inventor: Yasuo Kita, Kyoto, Japan

[73] Assignee: Shimadzu Co., Kyoto, Japan

[21] Appl. No.: 181,961

[22] Filed: Aug. 28, 1980

[30] Foreign Application Priority Data

Aug. 31, 1979 [JP] Japan ................... 54-112087

[51] Int. Cl.³ .......................... F22B 3/06; F24C 9/00
[52] U.S. Cl. ..................... 122/26; 126/247;
237/8 C; 417/334; 416/32; 416/37
[58] Field of Search ........... 122/26; 126/247;
237/8 C; 417/334, 92; 236/100; 416/32, 37

[56] References Cited

U.S. PATENT DOCUMENTS

| 3,118,648 | 1/1964 | Campbell | 236/100 |
| 3,334,812 | 8/1967 | Bailey | 236/100 X |
| 3,813,036 | 5/1974 | Lutz | 126/247 X |
| 3,822,740 | 7/1974 | Hackett | 417/292 X |
| 3,952,723 | 4/1976 | Browning | 417/334 X |
| 3,989,189 | 1/1976 | Kita | 126/247 X |
| 4,114,809 | 9/1978 | Sampson | 126/247 X |

FOREIGN PATENT DOCUMENTS 7605656 11/1977 Netherlands ............ 237/8 C

Primary Examiner—Richard E. Gluck
Attorney, Agent, or Firm—Birch, Stewart, Kolasch & Birch

[57] ABSTRACT

A wind turbine to convert wind energy into hydraulic energy by a positive displacement hydraulic pump driven by a wind mill. To the oil outlet of the hydraulic pump, a thermo-sensitive control element is attached, which functions when the oil temperature exceeds a certain limit. By the control element, the oil outlet is closed, suppressed, or opened to ensure safety of equipment and for effective use of energy.

8 Claims, 4 Drawing Figures

WIND TURBINE

BACKGROUND OF THE INVENTION

The present invention relates to a wind turbine to convert wind energy into hydraulic energy. Wind energy has long been used as a source of energy in various ways in a small scale, grain milling or water pumping for example, and recently it is reviewed as a form of clean energy, readily available and never exhausted, for large scale utilization such as electric power generation by large sized wind mills.

Wind energy is utilized by converting a part of the kinetic energy of the air passing through wind mills at certain velocity into mechanical energy, i.e. by manifesting itself as the product of the shaft turning force and the angular velocity of the shaft rotation. For the energy conversion in the first stage, as the wind mill for large scale power generation for instance, variable pitch type propellers or vertical Dalius type large sized wind mills are used trying to increase the conversion efficiency as much as possible. For medium and small scale wind mills, however, fixed pitch propeller type wind mills are generally used, and in this case, it is desired to use the mechanical energy produced more effectively since the energy conversion efficiency is substantially lower as compared with the large sized wind mills. From this viewpoint, it was attempted to drive a hydraulic pump by wind mills to pressurize the oil, and to cause pressure loss positively to the hydraulic oil by passing the pressurized hydraulic oil through the orifice or throttle valve assembled in series into the hydraulic circuit. To convert wind energy into hydraulic energy and further into heat energy and to use the heat energy for example, for heating would be one of the best ways of utilizing the mechanical energy of medium and small scale wind mills, because a considerable portion of the friction loss, (including fluid friction) in the energy conversion process, i.e. the heat energy loss can be collected in the form of temperature rise of oil. This technology is disclosed in the Specification of U.S. Pat. No. 3,989,189.

As this type of equipment is ordinarily operated continuously over a long period, it is important that no troubles develop during the period and that not much care is required for the maintenance. Since the hydraulic oil is used by circulation, the heat evolved in the later conversion process into heat energy may possibly affect the former conversion process of wind energy into hydraulic energy thus overheating the system. It is essential, therefore, to keep the oil temperature at a constant level, for instance, to prevent the temperature from going up above 80° C. as it leads to troublesome maintenance such as replacement or repair if the oil deteriorates or the sealing materials and bearings are damaged by excessive temperature rise of the system when the heat energy obtained from wind energy and the consumption are unbalanced resulting in the accumulation of extra heat energy in the heat generation system. To the wind mills used as the means to introduce wind energy, it is also necessary to prevent damage due to over-speed rotation when a high wind continues for a long time.

BRIEF SUMMARY OF THE INVENTION

Accordingly, it is an object of the invention to provide a wind turbine that ensures safety of equipment by preventing temperature rise of the hydraulic oil above a certain limit in the conversion process from wind energy into hydraulic energy.

Another object of the invention is to provide a wind turbine with the mechanism to convert wind energy into hydraulic energy by a positive displacement hydraulic pump driven by the wind mill so composed to stop rotation of the wind mill or to prevent over-speed rotation when a high wind continues.

A further object of the invention is to provide a mechanism of simple and accurate motion that responds to the temperature rise of hydraulic oil.

Briefly, the foregoing objects are accomplished by a wind turbine having the conversion mechanism of wind energy by a positive displacement hydraulic pump driven by the wind mill, and by closing, suppressing or opening to a by-pass the discharge outlet of the hydraulic pump with a thermosensitive element that functions when the oil temperature exceeds a certain limit and is attached to the discharge outlet of the hydraulic pump.

DETAILED DESCRIPTION

CONSTRUCTION

Figure 1:
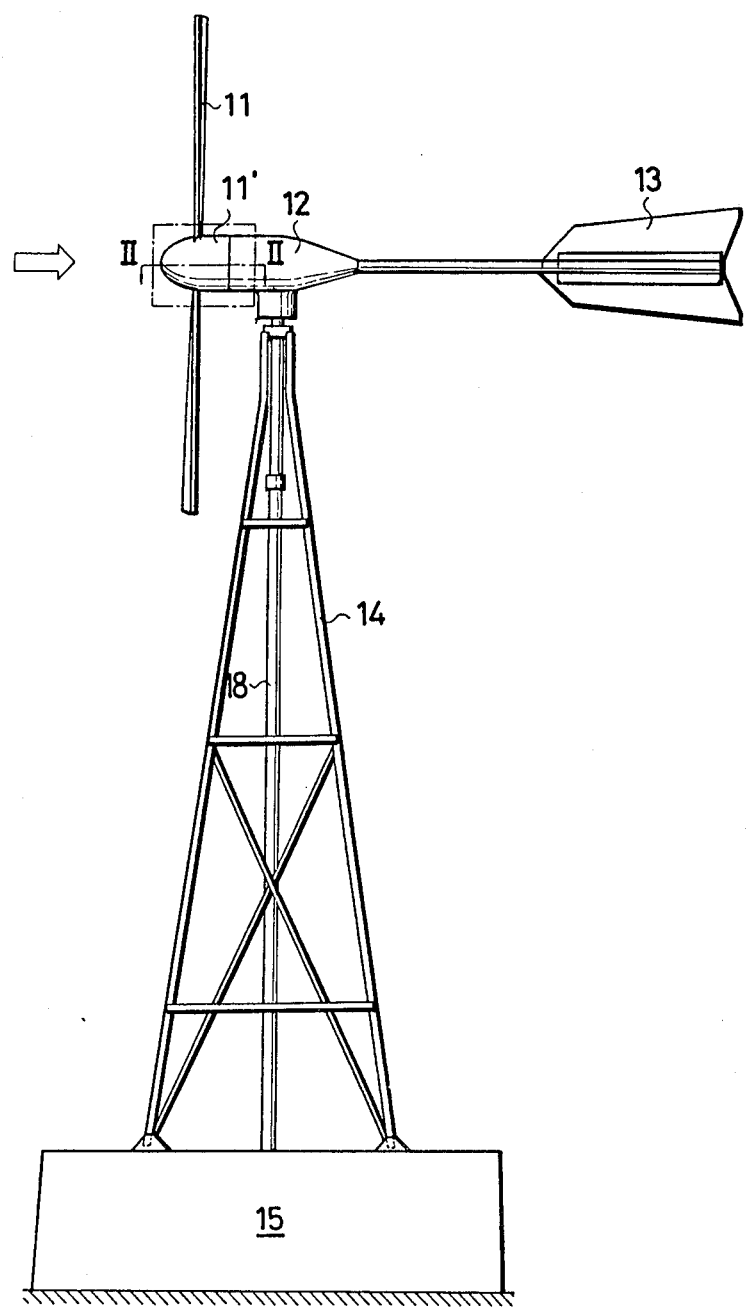
FIG. 1 is a side view of the equipment of an embodiment of the invention.

Referring now to the drawings, construction of the preferred embodiments of the invention are explained as follows.

Figure 2:
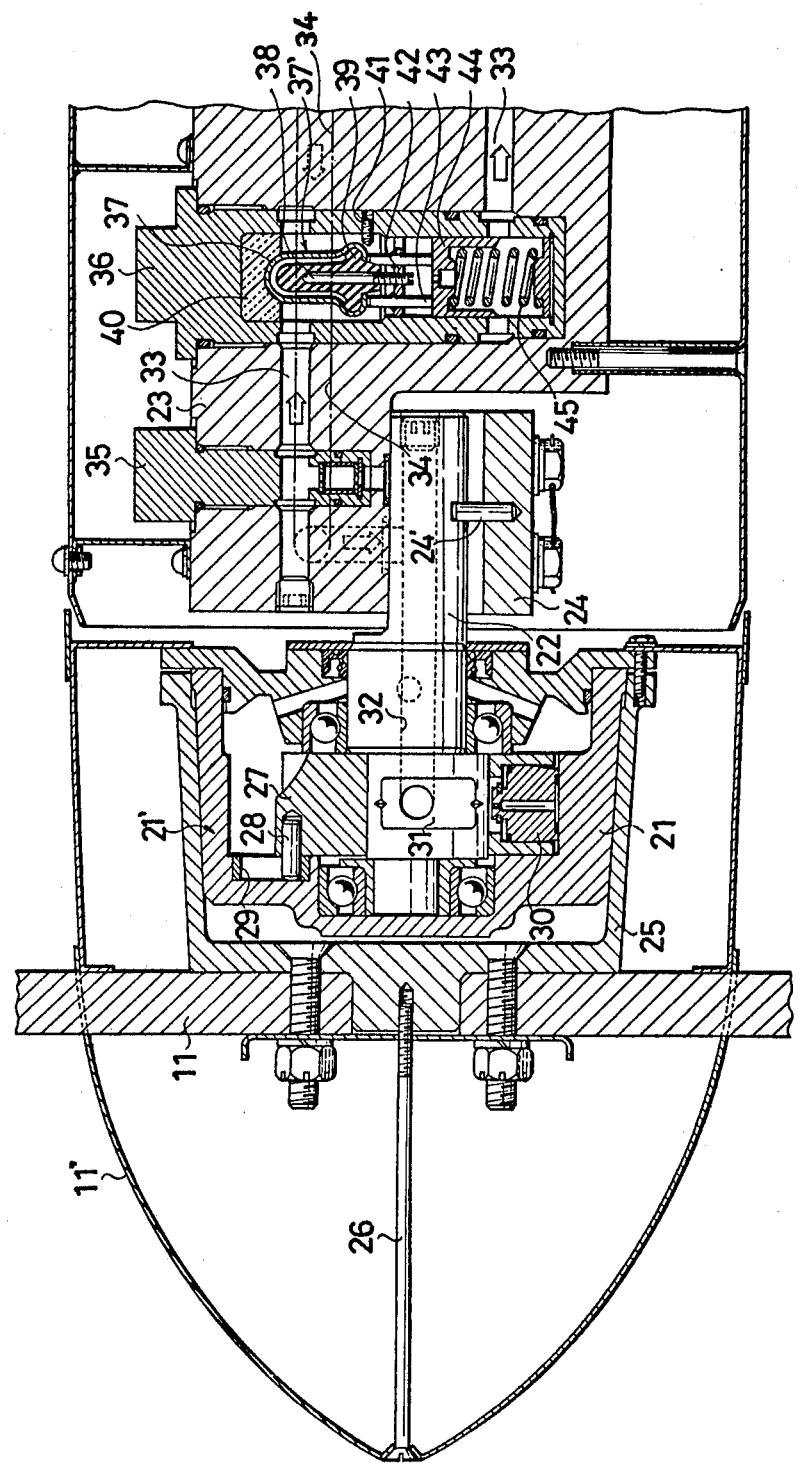
FIG. 2 is a sectional view 11—11 of the part enclosed by an alternate long and short dash line in FIG. 1, looking in the arrow direction.
Figure 3:
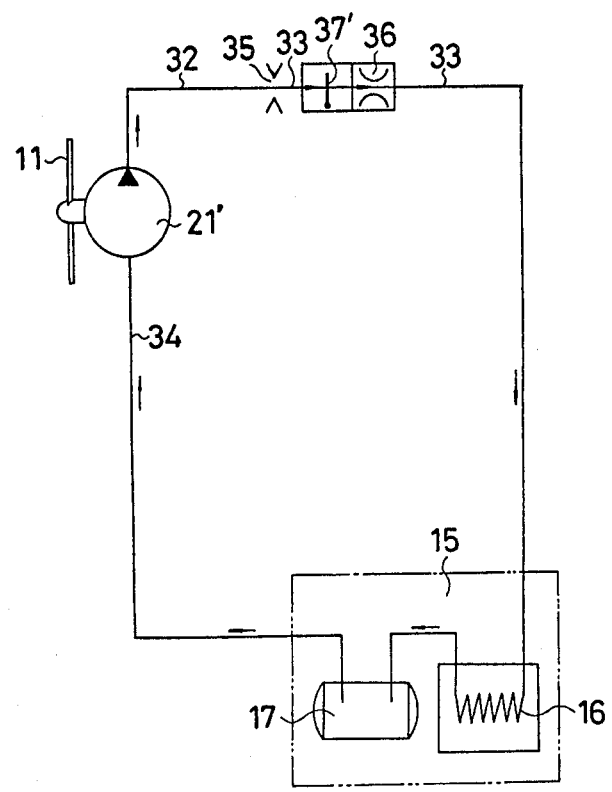
FIG. 3 is the main hydraulic circuit diagram of one embodiment.

FIG. 1 is the outline side view of the whole equipment, FIG. 2 is a sectional view of the part enclosed by an alternate long and short dash line in FIG. 1 and FIG. 3 is the main hydraulic circuit diagram of the embodiment.

In the drawings, (11) is a propeller of the wind mill of the upstream fixed pitch type, (11') is a wind mill spinner that runs along with the wind mill, (12) is a wind mill housing, (13) is a fixed tail of weather-cock type attached to the housing with a pipe in-between, (14) is a support frame to support the wind mill housing allowing it to turn freely, (15) is the building as the foundation and to house the radiator (16) and oil tank (17) (FIG. 3), and (18) is the piping provided between the wind mill housing (12) and the building (15).

With the wind mill of the embodiment composed in this manner, the propeller (11) is always positioned windward against the direction of wind.

Referring to FIG. 2, (21') is a positive displacement hydraulic pump, and to be more specific, a case rotation radial piston type hydraulic pump, of which spindle (22) is fixed to the support block (23) firmly from the side with a cap (24) having a V-shaped concave, and the fixing position of the spindle (22) is regulated by a positioning pin (24'). The support block (23) is attached to the upper end of the support frame (14) so as to turn freely. (25) is the mounting adaptor for the propeller to directly connect the wind mill, i.e. the fixed pitch type propeller (11) to the hydraulic pump (21') and functions as the propeller hub at the same time. (26) is the connecting rod to connect the front half of the wind mill spinner (11') to the propeller mounting adaptor (25).

As for the construction of the case rotation type hydraulic pump (21'), only the structure of the main part is described as it is not directly associated with the present invention.

(21) is a case with the inner face finished as a pentagon, (27) is a cylinder block with pentagonal outer face, which is turned along with the rotation of the case (21) while keeping parallel between the pentagonal faces of the case (21) and the cylinder block (27) by the rotation synchronizing mechanism composed of the synchronizing pin (28) embedded in the cylinder block and the synchronizing ring (29) provided on the case (21). (30) is the piston placed in one of the five cylinders equally spaced on the cylinder block (27) in radiant shape, and (31) is the double chamfered section of the eccentric cylinder cam of the fixed spindle (22) forming a changeover valve together with the cylinder block (27). (32) is the discharge oil outlet passing through the fixed spindle (22) and opened to the double chamfered section (31) and also connected to the discharge oil outlet (33) provided in the support block (23). (34) is the suction oil path provided in the support block (23) connected to the discharge oil outlet (32) through the fixed spindle (22) and parallel to the discharge oil outlet (33). The suction oil path is opened on the opposite side of the double chamfered section (31) of the eccentric cylinder cam. (35) is a cartridge type orifice, of two-stage arrangement for example, for heat generation provided in series between the discharge oil outlets (32) and (33).

The suction oil path (34) and the discharge oil outlet (33) are respectively connected to the piping (18) arranged in an up-down direction at the center of the support frame (14). Since the support block (23) is attached to the support frame (14) together with the wind mill housing (12) so as to turn freely, these oil paths (33) and (34) are connected to the piping (18) through the rotary type oil path joint (not illustrated) assembled into the right part of the support block (23).

(36) is a pressure compensated flow control valve incorporating the oil temperature sensing element (37), guide plate (42) and push rods (43) and provided in series with the discharge oil path (33).

Figure 4:
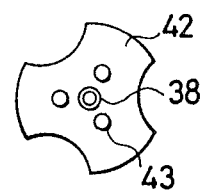
FIG. 4 is a top view of the guide plate.

The thermo-sensitive element (37') consists of a long cap form core (39) made of heat-resistive rubber and having a rod (38) with a threaded section on the top end embedded in the center, a cap (37) to retain the core (39) covering the collar and keeping a certain gap in-between, and of the paraffin wax filled into the gap and composed so as to melt at certain temperature, 80° C. for example. To hold the thermo-sensitive element at a specified position, the semi-spherical head is fit to the concave seat (40) of the heat insulating member inserted into the further end of the cylindrical hole on the valve body (36), while the base periphery is evenly tightened by three setscrews (41) spaced equally on the valve body (36). (42) is a guide plate inserted into the cylindrical hole on the valve body (36) so as to move freely, and as shown in the top view of FIG. 4, arc notches as the oil path are provided at three points on the periphery, and at the center, a rod (38) is connected to the thread, and three push rods (43) are also fixed being spaced equally around the rod.

The thermo-sensitive mechanism consists of a thermosensitive element (37'), push rods (43) connected to the rod (38) incorporated in the element, and of the guide plate (42). (44) is the valve piston having an orifice at the top center inserted into the cylindrical hole on the valve body (36) so as to slide freely, such that the outlet port of the said valve body (36) is throttled or blocked by the piston skirt. (45) is a coil spring compressed and housed between the spring seat attached to the end of the cylindrical opening on the valve body (36) and the spring holder of the valve piston (44). When the support frame (14) is high and the height difference between the hydraulic pump (21') and the oil tank (17) becomes too much, it is not favorable for oil suction. As a countermeasure, the oil tank (17) is made of a sealed configuration, and in addition, an adequate pressuring flexible tube to apply a certain boost pressure onto the suction oil path near the suction port of the hydraulic pump is installed and is connected to the suction oil path so that the piping system composes a closed circuit.

OPERATION

Now follows the description on the operation of this apparatus. With the fixed pitch type propeller wind mill (11) so composed that the propeller (11) is always positioned windward against the direction of wind, the rotational velocity increases directly as the wind speed increases up to a certain limit as described later. Since the case rotation radial piston pump (21') is of a positive displacement type, the delivery increases in proportion to the increase in the rotation velocity of the propeller (11). The diameter of the orifice at the top of the valve piston (44) of the pressure compensated flow control valve (36) assembled in series to the oil discharge path (33) is determined corresponding to the setting flow rate described later. Provided the oil flowing inside at a pressure $P_1$ passes through the orifice and comes down to pressure $P_2$ and the valve piston is balanced, $$P_1 A_1 = P_2 A_1 + K$$

where,
$A_1$ is pressure receiving area of valve piston (44), and
K is spring force of coil spring (45)
Accordingly, $$P_1 - P_2 = \Delta P = K/A_1 = \text{constant}$$

Since the pressure difference before and after the orifice is constant, it is possible to set the flow rate through the valve at a constant level whether the pressure change is realized at the up-stream or down-stream of this valve, once the opening area of the orifice is determined. It is so arranged that the outlet port of the valve piston (44) of the valve body (36) is kept full open while the oil temperature is in normal level.

Accordingly, once the flow rate of the flow control valve (36) is preset equal to the discharge flow of the hydraulic pump (21') driven by the wind mill propeller (11) at a constant maximum allowable rotation speed, it is possible to turn the wind mill propeller (11) at a rotation speed proportional to the wind speed up to 20 m/s, for instance, and to turn it at a constant maximum allowable rotation speed, from 20 m/s to 25 m/s. In other words, the flow control valve (36) functions as an overspeed limiter of the wind mill propeller (11). When the wind velocity acting upon the propeller (11) of the wind mill increases, the angle of elevation becomes larger, and therefore, the lift increases and the propeller torque obtained from wind natually increases. Since the flow rate is limited at a constant level by the flow control valve(36), however, the increased portion of the torque mentioned above is used to increase the discharge pressure of the hydraulic pump(21') in the range of wind velocity increase from 20 m/s to 25 m/s, and the rotation speed of the wind mill propeller(11) is kept at a constant level. If the wind speed increases further, the propeller of the wind mill(11) stalls, the generated torque is decreased, thus the damage to the wind mill by over-speed rotation is prevented.

Now the operation to prevent excessive temperature rise of this system takes place in the following manner. The hydraulic oil pressurized by the hydraulic pump(21') positively causes pressure loss while it goes through the cartridge type orifice(35) for heat generation, and the energy equal to the pressure loss is converted into heat energy to increase oil temperature. The heated hydraulic oil flows out to the down stream, passing through the pressure compensated flow control valve(36) and further through the radiator(16) to return to the tank(17). While the hydraulic oil circulates through this hydraulic circuit repeatedly, oil temperature, i.e. the system temperature of this wind heat generating system, increases gradually, and eventually, the heat is radiated through the radiator(16). The radiated heat is used for room heating and others, and the effect of heat accumulation is also realized by the heated oil returned to the oil tank. In this arrangement, it is desirable to cover the piping unit(18) directly exposed to outside air and also the suction tube, discharge tube as well as the tank(17) with heat-insulation material.

Since the wind mill propeller(11) and the hydraulic pump(21') are operated at a constant rate of rotation within a certain range, even if the wind velocity changes, as described above, it is possible to carry out the constant operation by balancing the radiated heat energy through the radiator(16) with the wind energy obtained by the wind mill. If the radiated heat energy from the radiator and the consumption are unbalanced, and the extra heat energy is accumulated, however, the system temperature increases quickly. In this condition, the temperature of the cap(37) increases abruptly because the cap(37) of the thermo-sensitive element incorporated in the pressure compensated flow control valve(36) is always exposed to the oil of the highest temperature in this wind heat generating system immediately after passing through the heat generation stimulating orifice(35), while the concave seat(40), to which the cap is depressed, is made of heat insulating material and therefore, heat radiation by conduction is prevented.

Accordingly, the wax filled in the gap between the cap(37) and the core(39) is heated by conduction from the part in contact with the cap(37), and the temperature is increased reaching the melting temperature, 80° C. for example. When the heat quantity required for melting is absorbed, the wax starts melting gradually from the surface. Since the volume of the wax expands when it changes from solid phase to liquid phase, the core member(39) made of heat-resistive rubber is pushed out through the opening of the cap(37) corresponding to the degree of phase change. As a result, the rod(38) embedded in the core(39) is pushed out, the guide plate(42) is moved toward the side of valve piston(44), and the push rod(43) moves the valve piston(44) against the spring force of the coil spring(45) at the same time. At the skirt part, therefore, the outlet port of the flow control valve(36) is greatly narrowed. Since the preset flow rate is limited in this manner, the rotation speed of the hydraulic pump is depressed. When the circulating oil quantity of the system is throttled in this manner, the unbalance between the radiated heat energy from the radiator(16) and the consumption is liquidated and excessive increase of the system temperature i.e. oil temperature, is prevented. If the extra heat energy is accumulated quickly, the whole quantity of the wax turns to liquid phase, the thermo-sensitive operation mechanism directly closes the outlet port of the flow control valve(36) through the process as described above, and both the hydraulic pump(21') and the wind mill propeller(11) are stopped.

When the system temperature comes down below the melting point of the wax by radiation through the radiator(16), the wax starts to coagulate, and the volume contracts in a reverse way, and therefore, the opening of the outlet port of the pressure compensating flow control valve(36) becomes greater corresponding to the phase change from solid to liquid in a reverse way, as above. When the whole quantity returns to a solid phase, the outlet port becomes completely open.

While the above embodiments of the invention have been illustrated and described in detail, it is particulary understood that the invention is not limited thereto or thereby.

Generally used as the thermo-sensitive elements are gas such as air, liquid as mercury or alcohol, and solid as bimetal made of the combination of amber and brize, of which length and volume are changed by thermal expansion. These are primarily used, however, for temperature indication or contact switching of electrical circuits, and in some cases, are not adequate to be incorporated into a direct operation type control mechanism suitable for valve switching, which requires rather a large stroke. Since the wax described above is subjected to phase change at comparatively low temperature and the rate of volume change is quite high, it is possible to compose a direct operation type controller of substantially large stroke by a simple mechanism having the wax sealed inside. Application of this wax to a direct operation controller, therefore, is a favorable embodiment and is particularly convenient when the wind turbine is installed at an out-of-the-way place among mountains, as it requires no other energy supply such as electricity to drive it, can be used repeatedly following temperature changes, and is free of maintenance.

It is also possible to use the heat of hydraulic oil above a certain temperature effectively by such arrangement as to change-over and connect the discharge oil outlet to a by-pass of heat generation orifice provided separately by means of a thermo-sensitive element that functions when the system temperature exceeds a certain level, or to connect the wind mill and hydraulic pump with a clutch, for example, and to turn only the wind mill by separating the hydraulic pump while disengaging the clutch.

What is claimed is:

1. An apparatus for converting wind energy into hydraulic energy which comprises in combination a hydraulic pump means for pumping a hydraulic fluid through said apparatus, a propeller means for driving said hydraulic pump means, a radiator means, a means for storing said fluid, a pipe means for connecting said radiator means and fluid storage means in a closed loop with said hydraulic pump means through which said fluid is circulated, and a thermosensitive mechanism for controlling and regulating the flow of said fluid in response to the velocity of the rotation of said propeller means so as to prevent damage to said apparatus, said thermosensitive mechanism comprising a thermosensitive element responsive to a variation in temperature of said hydraulic fluid, a flow control means responsive to said thermosensitive element for controlling the flow of said hydraulic fluid in response to said wind driven propeller means, controlling the rotation of said propeller so as to eliminate damage to said apparatus and means for linking said thermosensitive element to said flow control means.

2. The apparatus of claim 1, wherein said thermosensitive element comprises a heat-resistive elastic member, a heat-conductive cover together defining a gap therebetween which is filled with a volume-variable means which expands as temperature of the fluid increases.

3. The apparatus of claim 2, wherein said volume-variable means comprises wax.

4. An apparatus according to claim 2, wherein said linking means comprises at least one connecting rod interconnected to said heat-resistive elastic member which expands or contracts with the volume-variable means so as to regulate said flow control means so as to regulate the flow of the hydraulic fluid.

5. The apparatus of claim 4, wherein said rod is provided with a means for adjusting said flow control means.

6. The apparatus of claim 1, wherein said flow control means is separatable from said linking means, said flow control means comprising a pressure compensated flow control valve.

7. The apparatus of claim 1, wherein said flow control means comprises a piston linked by said linking means to said thermal-sensitive element, said piston having an aperture therethrough through which said fluid flows, said aperture having a sufficiently small diameter to maintain the flow rate of the hydraulic fluid constant, said piston comprising a skirt means interrelated with a spring means so as to regulate the flow of said hydraulic fluid from said flow control means so as to balance the fluid pressure within said thermosensitive mechanism.

8. The apparatus of claim 7, wherein the position of the skirt of said piston is adjustable by a screw provided on said linking member.

* * * * *